US008448438B2

(12) United States Patent
Janus et al.

(10) Patent No.: US 8,448,438 B2
(45) Date of Patent: May 28, 2013

(54) INDIRECT-FIRED GAS TURBINE POWER PLANT

(75) Inventors: Jason Janus, Edmonton (CA); Brian Fleck, Edmonton (CA); Donald Gauthier, Ottawa (CA); Ted R. Heidrick, Sherwood Park (CA)

(73) Assignee: Firebox Energy Systems Ltd., Calgary, Alberta (CA)

( * ) Notice: Subject to any disclaimer, the term of this patent is extended or adjusted under 35 U.S.C. 154(b) by 745 days.

(21) Appl. No.: 12/299,285

(22) PCT Filed: May 2, 2007

(86) PCT No.: PCT/CA2007/000741
§ 371 (c)(1),
(2), (4) Date: Nov. 13, 2009

(87) PCT Pub. No.: WO2007/124592
PCT Pub. Date: Nov. 8, 2007

(65) Prior Publication Data
US 2010/0050639 A1  Mar. 4, 2010

Related U.S. Application Data

(60) Provisional application No. 60/796,587, filed on May 2, 2006.

(51) Int. Cl.
*F01K 25/02* (2006.01)
(52) U.S. Cl.
USPC .............................................. 60/650; 60/683

(58) Field of Classification Search
USPC ............................................ 60/650, 682–683
See application file for complete search history.

(56) References Cited

U.S. PATENT DOCUMENTS

| 2,820,348 A | 1/1958 | Sauter |
| 4,037,413 A | 7/1977 | Heller et al. |
| 4,228,659 A | 10/1980 | Lowther |
| 4,326,382 A | 4/1982 | Baardson |
| 4,380,154 A * | 4/1983 | Eastman ........................ 60/682 |
| 4,492,085 A | 1/1985 | Stahl et al. |

(Continued)

FOREIGN PATENT DOCUMENTS

JP  2005-069575  3/2005

OTHER PUBLICATIONS

Firebox Energy Systems Ltd., State Intellectual Property Office of the People's Republic of China, First Office Action issued for Patent Application No. 200780024796.2, dated Dec. 24, 2010, 7 pages.

(Continued)

*Primary Examiner* — Hoang Nguyen
(74) *Attorney, Agent, or Firm* — Michael G. Johnston; Moore & Van Allen PLLC

(57) ABSTRACT

An indirect-fired gas turbine power plant comprises a compressor; a turbine mechanically coupled to the compressor; a furnace; a heat exchanger inside the furnace and fluidly coupled at an inlet end to the compressor and at an outlet end to the turbine; and means for forming a gas barrier around a portion of the heat exchanger to impede combustion products from contacting the heat exchanger. Such means can be a plurality of gas discharge manifolds located around a portion of the heat exchanger. The manifolds can be coupled to heated working gas exhausted by the turbine.

23 Claims, 17 Drawing Sheets

U.S. PATENT DOCUMENTS

| | | | |
|---|---|---|---|
| 4,785,634 | A | 11/1988 | Alderson et al. |
| 4,840,226 | A | 6/1989 | Richlen |
| 5,431,016 | A * | 7/1995 | Simpkin .................. 60/650 |
| 5,799,724 | A | 9/1998 | Cassidy et al. |
| 5,934,065 | A | 8/1999 | Bronicki et al. |
| 6,490,985 | B2 | 12/2002 | Yamamoto et al. |
| 6,629,413 | B1 | 10/2003 | Wendt et al. |
| 2003/0066291 | A1 * | 4/2003 | Filippone .................. 60/698 |

OTHER PUBLICATIONS

International Patent Application No. PCT/CA2007/000471, International Search Report and Written Opinion, dated Jul. 31, 2007.

International Patent Application No. PCT/CA2007/000471, International Preliminary Report on Patentability, dated Aug. 11, 2008.

Firebox Energy Systems Ltd., Korean Patent Application No. 10-2008-7027981, Notification of Provisional Rejection, Nov. 16, 2011.

Firebox Energy Systems Ltd., Korean Patent Application No. 10-2008-7027981, Notification of Provisional Rejection, Feb. 3, 2012.

Firebox Energy Systems Ltd., Korean Patent Application No. 10-2008-7027981, Statement of Opinion, Jan. 13, 2012.

Firebox Energy Systems Ltd., Korean Patent Application No. 10-2008-7027981, Statement of Opinion, Mar. 22, 2012.

Firebox Energy Systems Ltd., Indonesian Patent Application No. W-00200803883, Official Action, Dec. 2, 2011.

* cited by examiner

INDIRECT-FIRED GAS TURBINE POWER PLANT

FIELD OF THE INVENTION

The present invention relates to turbine power plants, and more particularly to indirect-fired gas turbine power plants.

BACKGROUND OF THE INVENTION

Gas turbines are well-known mechanisms for generating electrical power. The turbine is driven by a heated compressed working gas to drive a shaft which powers an electrical generator. The working gas is heated by heat produced from combustion of air and a fuel and is compressed by a compressor coupled to the turbine. Traditional gas turbines are often limited to expensive refined fuels, such as distillate oil and natural gas.

A type of known gas turbine is an indirect-fired gas turbine wherein the working gas is kept separate from the combustion products by a heat exchanger that transfers heat generated by the combustion process to the working gas. The heat exchanger is located inside a separate furnace wherein the combustion of the fuel and air occurs. This indirect cycle duplicates the Brayton cycle that occurs in conventional gas turbine operations. Such indirect-fired gas turbines are particularly attractive as they do not expose the turbine components to harmful combustion products. Further, it is possible to utilize less refined and consequently less expensive fuels such as coal, heavy oil, wood products and other biomass, solution gas and combustible waste material in the combustion process (hereinafter "unrefined fuels").

The heat exchanger has conduits in the furnace which will have surface temperatures far above what is typical for conventional steam boiler systems. This high temperature is achieved by direct radiant heating from a luminous flame in a primary combustion chamber of the furnace. The aforementioned heavier fuels will typically burn with highly luminous flames that more readily radiate thermal radiation than lighter fuels like natural gas, propane or refined liquids. Thus, heavier fuels are advantageous for higher rates of heat transfer. One disadvantage of using unrefined heavier fuels is that the luminous flames from these fuels tend to contain one or a mixture of highly reactive radicals, corrosive sulphur compounds and other radicals, as well as fouling substances like metals, soot, slag, ash or un-burnt fuel. Such particles when contacting the heat exchanger conduits can be harmful to and reduce the thermal effectiveness and lifespan of these conduits.

SUMMARY OF THE INVENTION

It is an object of the invention to provide an indirect-fired gas turbine power plant that solves at least some of the problems of prior art indirect-fired gas turbine power plants.

According to one aspect of the invention, there is provided an indirect-fired gas turbine power plant comprising: a compressor; a turbine mechanically coupled to the compressor; a furnace; a heat exchanger inside the furnace and fluidly coupled at an inlet end to the compressor and at an outlet end to the turbine, and means for forming a gas barrier around a portion of the heat exchanger to impede combustion products from contacting the heat exchanger. Such means for forming a gas barrier can be fluidly coupled to the turbine to receive heated working gas exhausted from the turbine for forming the gaseous barrier.

The heat exchanger can comprise a convective heating section and a radiant heating section. In such case, the means for forming a gas barrier is located around the radiant heating section.

The furnace can have a burner fluidly coupled to a fuel source selected from the group consisting of wood products and other biomass, coal, heavy oil, solution gas and combustible waste material. The burner can be fluidly coupled to the turbine to receive heated air exhausted from the turbine for combustion in the furnace. The furnace can also have an afterburner located at an exhaust end of the furnace and fluidly coupled to the fuel source.

The means for forming a gas barrier can comprise at least one manifold coupled to a gas source and having at least one gas nozzle directed at around a portion of the radiant heating section. More particularly, a plurality of manifolds can be provided which surround the portion of the radiant heating section. This portion of the radiant heating section can comprise a plurality of generally straight and parallel spaced conduits. In such case, the manifolds are directed at spaces in between the conduits. A refractory lining can be provided which covers a part of at least some of the conduits. The means for forming a gas barrier can further comprise a refractory diverter positioned around the manifolds and conduits such that gas discharged by the nozzles is directed to form the gas barrier.

The power plant can also include a recuperator which thermally couples a working gas exhaust stream from the turbine with a working gas stream from the compressor to the heat exchanger.

The power plant can also include an evaporative cooling assembly that is coupled to the compressor. Such an evaporative cooling assembly can comprise at least one of an inlet fogging device fluidly coupled to a working gas supply stream to the compressor, a water spray fluidly coupled to a working gas stream from the compressor to the heat exchanger, and an intercooling spray directed at the compressor.

The power plant can also include a steam injection assembly that thermally couples an exhaust stream from the furnace with a water stream fluidly coupled to a working gas stream from the compressor to the heat exchanger. Steam is produced by the heat transferred from the exhaust stream to the water stream. The steam is injected into the working gas stream.

According to another aspect of the invention, there is provided a furnace for an indirect-fired gas turbine power plant. The power plant comprises a compressor and a turbine mechanically coupled to the compressor. The furnace comprises a heat exchanger inside the furnace and for fluidly coupling at an inlet end to the compressor and at an outlet end to the turbine, and means for forming a gas barrier around a portion of the heat exchanger to impede combustion products from contacting the heat exchanger.

BRIEF DESCRIPTION OF THE DRAWINGS

The following drawings illustrate exemplary embodiments of the present invention.

DETAILED DESCRIPTION OF EXEMPLARY EMBODIMENT

Referring now in detail to the accompanying drawings, there are illustrated various embodiments of an indirect-fired gas turbine power plant according to the present invention, generally referred to by the numeral 10.

Figure 1:
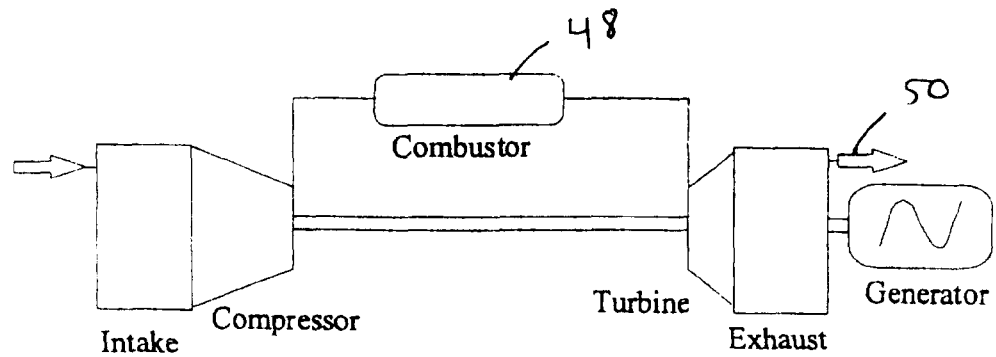
FIG. 1 is a schematic illustration of a simple prior art power plant comprising a combustor.
Figure 2:
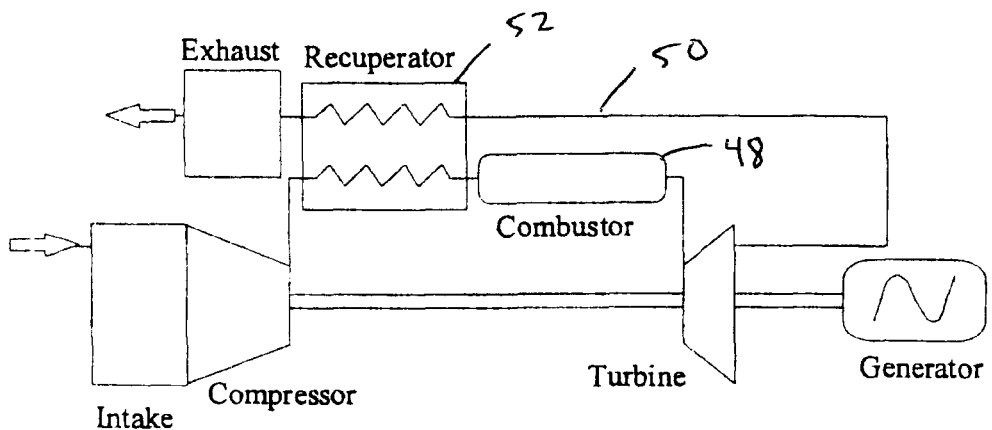
FIG. 2 is a schematic illustration of a prior art power plant comprising a combustor and recuperator.

FIGS. 1 and 2 illustrate two common prior art turbine power plants. In FIG. 1, a simple power plant is illustrated, where a combustor 48 is used to heat compressed air prior to introduction to the turbine; exhaust 50 is simply ejected from the turbine. An option to improve the efficiency of such a simple gas turbine engine is to use a recuperator, as illustrated in FIG. 2. The recuperator 52 is essentially a form of heat exchanger, which transfers heat from the exhaust gas 50 generated by the combustor 48 to preheat the compressed air going to the combustor 48. Note that the combustor 48 is sometimes located downstream of the turbine, to add heat to the turbine exhaust 50 before the exhaust enters the recuperator 52.

Figure 3:
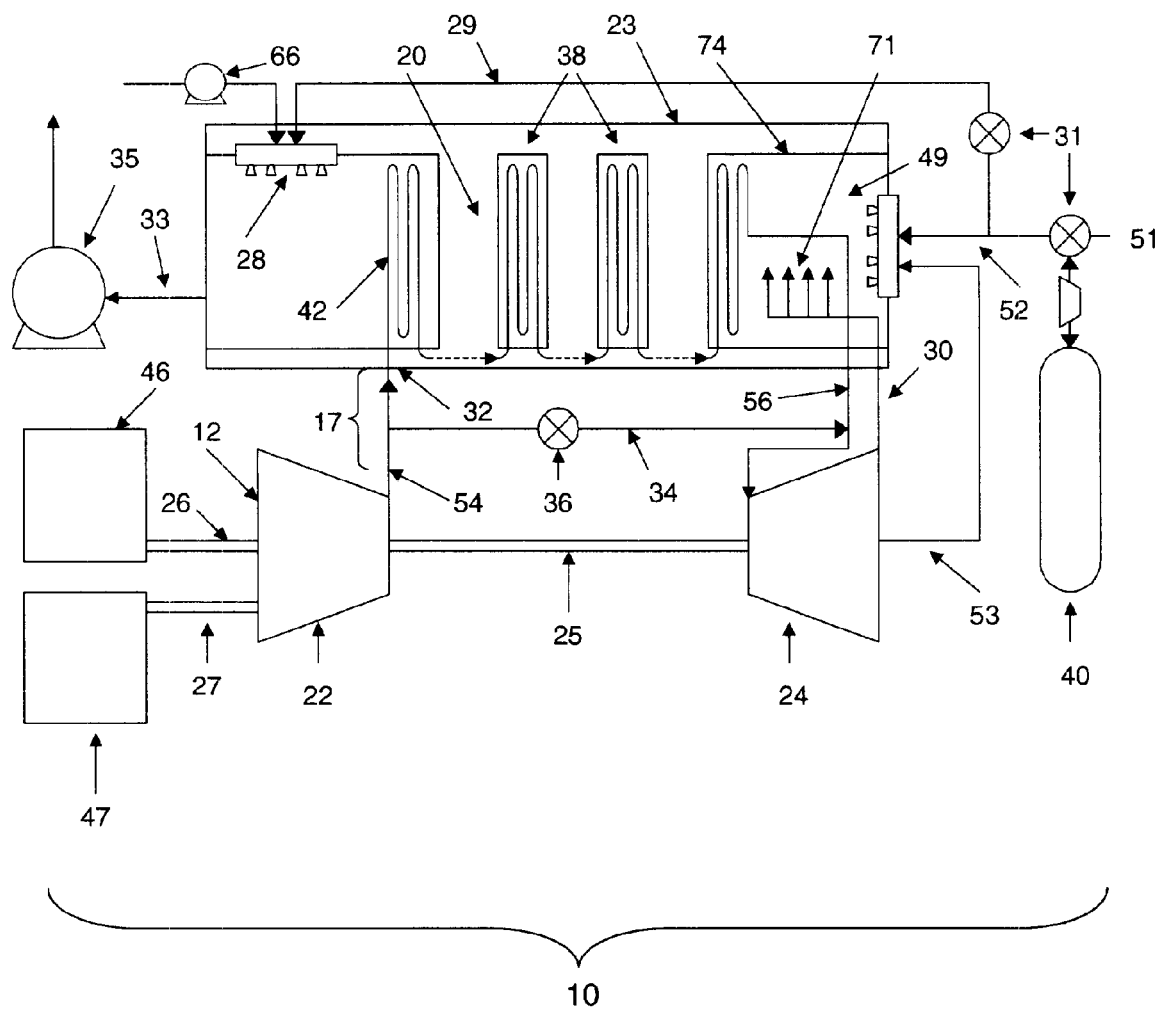
FIG. 3 is a schematic illustration of an indirect-fired gas turbine power plant according to a first embodiment of the invention.

Referring now in detail to FIG. 3 and according to a first embodiment of the invention, an indirect-fired gas turbine power plant 10 is provided that is particularly effective using both refined and unrefined fuels. Examples of refined fuels include natural gas, propane, and distillate oil. Unrefined and heavier fuels include coal, heavy oil, wood products and other biomass, solution gas and combustible waste material. Using unrefined fuels is particularly attractive when the power plant 10 is located in a remote site, and there is no ready access to refined fuels. For example, the power plant 10 can be located in a remote work camp and provided with a natural gas storage tank that is only refilled periodically. In such case, more readily accessible fuels such as wood products can be combusted by the power plant 10. Furthermore, unrefined fuels are typically substantially less expensive than refined fuels. Because combusting certain unrefined fuels produces combustion products that can be harmful to components inside a furnace of the power plant 10, the power plant 10 is provided with an gas barrier assembly 71 which operates to protect the components as will be described in detail below.

The power plant 10 comprises a compressor 22, which takes in a working gas at a compressor inlet 12 and compresses the air to a high pressure. The working gas in this embodiment is ambient air; however, other working gases can be used as is known in the art, either in a partially closed or fully closed cycle. The compressed air increases in temperature by virtue of this compression process. The compressed air is directed into a high-pressure air manifold 17 (compressed air passage means), which is a closed duct, and which delivers some portion of the compressed unheated air to a heat exchanger assembly 20 in a furnace 23 wherein the air is heated. After heating, the air is directed into a turbine 24 to generate work as is known in the art.

The heat exchanger assembly 20 is the main tie-in component to the furnace 23 and turbine 24. It allows the turbine 24 to operate without directly contacting either fuel or exhaust products, thus eliminating the need to have expensive protective enhancements to the turbine 24. Another benefit of this design is that the life of the turbine is greatly increased, reducing long-term costs. High-temperature metal alloys are readily available which will permit the performance of the power plant 10 to achieve levels similar of those of conventional gas turbine engines. In fact, when using the heated air from the gas turbine exhaust as combustion air in the furnace 23, the overall performance of the present invention can exceed that of a conventional gas turbine engine.

A gas turbine engine can be one of a number of known turbine types within the scope of the present invention. The most appropriate are gas turbines with can-type combustors that can be readily modified for use with the power plant 10. The overall rate of heat addition will be an important factor to consider. The modular design, coupled with silo-type gas turbines, has many advantages over other technologies not only in versatility to meet user needs but also in significant cost savings.

The air manifold 17 comprises an inlet 54, a heat exchange branch 32, a bypass branch 34, and an outlet 56. The inlet 54 is a closed duct which receives all the compressed air from the compressor 22 and branches into two paths; one branch, the heat exchange branch 32, leads to the heat exchanger 20, while the other branch, the bypass branch 34, provides a bypass past the heat exchanger 20 directly to the turbine 24. The bypass branch 34 comprises a variable flow control valve 36 that regulates air mass flow based on a closed loop control system with inputs based on furnace temperatures and flow rates; by allowing a fraction of the mass flow of air from the compressor 22 to not be heated in the heat exchanger assembly 20, this subsystem compensates for possible fluctuations in furnace temperature (which might be caused by unsteady fuel composition or mass flow rate) by adjusting the fraction of the total air mass flow that is heated in the heat exchanger assembly 20, which limits the temperature of the gases entering the turbine 24. The outlet 56 is a closed duct which receives separate air flows from the heat exchange and bypass branches 32, 34, and which combines these flows together into the turbine 24.

The furnace 23 is designed to burn fuels that are corrosive and inconsistent in content and flow-rate. Unlike other furnace technologies, the furnace 23 is designed to be extremely versatile, allowing for the use of low grade or contaminated fuel while delivering uniform heat distribution even if the fuel itself is of poor quality, as is often the case with solution gas. The furnace 23 is modifiable in shape and size to accommodate a wide variety of flow rates. The furnace 23 is preferably a refractory lined enclosure in which fuel and oxidant are mixed and react in a combustion reaction, thus releasing heat. Heat is removed from the furnace 23 by heat transfer to the heat exchanger assembly 20, which in turn imparts the heat to the working gas air passing through heat exchanger tubes 42 of the heat exchanger assembly 20. Because of the combination or reactant residence time, furnace temperature and adequate mixing of inlet streams, combustion efficiency of both good and low quality fuels in this furnace 23 will be comparable to the combustion efficiency in a typical internal combustion gas turbine combustion chamber. This furnace 23 operates near or slightly below ambient pressure to limit both the corrosive, high temperature and toxic effects furnace gases might have if they were to leak through the furnace 23.

The furnace 23 can have a modular burner layout allowing for adjustments in the furnace total output to be easily adapted to the amount of heat release of the fuel source. The heat exchanger assembly 20 comprises modular heat exchange sections 38. The design of each section 38 allows it to be added or removed depending on the amount of heat release available. This allows for easy adaptation as fuel flows rates either increase or decrease. The layout also accommodates the size of the gas turbine engine by adding or subtracting sections depending on the size of the gas turbine engine required. Compressed air enters from the manifold 17 and passes through consecutive banks of parallel corrosion resistant tubes 42 that run perpendicular to the mean flow of hot exhaust products in the furnace 23. The result is that energy in the form of heat is transferred from the hot furnace gases through the heat exchanger assembly 20 to the air in the high pressure manifold 17.

While the heat exchanger sections 38 are shown coupled in the series in FIG. 3, the sections 38 can be coupled in parallel, or a series—parallel combination.

The turbine 24 functions as in commonly known power plants of this general type, expanding the heated compressed air received from the air manifold 17 and in the process extracting work to drive a shaft 25, which in turn drives the compressor 22 and an electrical generator 46 via shaft 26 and/or a process duty 47 via shaft 27.

Fuel and air are injected into the furnace 23 through a burner 49 and into a combustion chamber and are combusted to generate heat energy as is well known in the art. The end of the furnace 23 where the burner 49 is located is referred to as the "burner end" of the furnace 23, and the combustion chamber refers to the part of the furnace 23 wherein combustion take place, which is generally in the radiant heating section of the furnace 23 as will be described in further detail below. The burner 49 has a fuel feed line 52 coupled to a fuel reservoir 40 which contains a refined fuel such as natural gas or propane. The fuel feed line 52 is also coupled to a second fuel source 51, which can be an unrefined fuel such as wood products and other biomass, heavy oil, or solution gas. Such materials are typically prepared into a fine powder or paste and injected by the burner 49 into the combustion chamber.

Therefore, the furnace 23 can operate using fuel from one or two sources. For example, natural gas from reservoir 40 can be used when the power plant 10 is started up, and then switched over to fuel from the second fuel source 51 after the power plant has reached a desired operating temperature.

The furnace exhaust comprising combustion products, unburned fuel and air in the combustion chamber flows through a breach (not shown) at a downstream end of the combustion chamber, past a particulate (ash) trap (not shown) wherein combustion particles are caught, and then out of the furnace 23 through a exhaust conduit 33 located at an exhaust end of the furnace 23 opposite the burner end. An exhaust fan 35 coupled to the exhaust conduit 33 provides a negative pressure inside the furnace 23 to suction the furnace exhaust out of the furnace 23.

An afterburner assembly 28 is provided near the exhaust end of the furnace 23. The afterburner assembly 28 is located downstream of the combustion chamber and heat exchanger 20 and is primarily responsible for ensuring that fluctuations in fuel flow about the design load are completely burned. Fuel in excess of that required to sufficiently heat the heat exchanger 20 is directed to the afterburner assembly 28 via an excess fuel feed line 29. Combustion air for the afterburner assembly 28 is provided by a blower 66. Heat released in the afterburner 28 does not contribute significantly to heating of working gas through the heat exchanger 20 since afterburner exhaust flows away from the heat exchanger 20 and out of the furnace 23 through the exhaust conduit 33. The afterburner 28 may fire intermittently and thus requires an actively monitored pilot and flame supervision system (not shown).

The power plant 10 is provided with control and check valves 31, which are synchronized to help regulate the fuel flow rate into the furnace 23, via the main burner 49 and the afterburner 28. The mechanism is designed to respond to both changes in measured incoming fuel flow and temperature diagnostics in the furnace 23. This is part of a closed loop control system that limits temperatures in the heat exchanger assembly 20 and maintains stable base load operation and possible turn down if required.

In this embodiment, the burner 49 receives air from an air feed line 53 which is coupled to an air exhaust outlet of the turbine 24; hot exhaust air from the turbine 24 is thus directed into the furnace 23 for use as combustion air. Alternatively, and as found in other embodiments, the combustion air can be provided by fresh air.

Other components of the power plant include:

Emission Control Systems (not shown): These components will vary depending on user needs. Given the fact that most solution gas has at least some sulphur content, having a treatment process in place is advantageous.

Turnkey Generator 46: This component converts the mechanical energy of the gas turbine to electrical power.

Process Duty 47: This component converts the mechanical energy of the gas turbine into non-electrical useful work, e.g. powering a pump at a work site.

Remote Telemetric Device (not shown): A monitoring and control mechanism allowing supervision of the system without the need for on-site personnel at all times. It will also allow for remote management of some control systems.

Referring now to FIGS. 15 to 18, the furnace 23 comprises a convective heating section 70 and a radiant heating section 73 and has a gas barrier assembly 71 that forms a gaseous barrier that protects heat exchange tubes 42 in the radiant heating section 73 from corrosive and other harmful particles formed primarily as a result of the combustion process. As previously described, the compressor 22 compresses the working gas and moves it to the manifold 17. The working gas travels through the manifold 17 and to the heat exchange branch 32, and then to the serpentine convective heat exchange tubes 42(*a*) in the convective heating section 70 wherein heat energy from the combustion process is primarily convectively transferred to the working gas. The working gas from each convective heat exchanger tube 42(*a*) then travels into a manifold 72 which is coupled to radiant heat exchange tubes 42(*b*) in the radiant heating section 73. These radiant heat exchange tubes 42(*b*) are generally straight and spaced apart from each other in generally parallel arrangement. The end of these radiant heat exchanger tubes 42(*b*) all feed into the manifold outlet conduit 56 which is coupled to the turbine 24. The working gas thus moves through the radiant heat exchanger tubes 42(*b*) wherein it is primarily heated by radiant heat and to the turbine 24 to produce work as is well known in the art. The residence time of the working gas within the furnace 23 is sufficient to add enough heat to the working gas to meet the turbine inlet temperature requirements and complete the Brayton cycle.

The working gas is routed to the convective heating section first 70 then radiant heating section 73 in accordance with standard counterflow heat exchanger design strategy.

The radiant heating section 73 contains the gas barrier assembly 71, radiant heat exchanger tubes 42(*b*), and the burner 49. Heated air from the turbine exhaust is directed via feed line 53 through the burner 49 and into the combustion chamber generally indicated as 74 in this Figure. Fuel from one or both of the fuel sources 40, 51 is directed by feedline 52 (not shown in FIGS. 15-18) through the burner 49 and into the combustion chamber 74. The fuel is ignited in the air and heat is generated in the combustion chamber 74 as is well known in the art.

The combustion chamber 74 is the primary combustion chamber for the base load of fuel. Fuel from the fuel source 40 or 51 that meets the base load heat release requirement enters here along with preheat air from the turbine 24. The combustion air and fuel combine in the non-premixed corrosion resistant burner 49 and react within this space. The net flow of gases is from the burner 49 towards the exhaust end of the furnace 23, where the convective section of the heat exchanger 20 is located. The furnace 23 size is chosen so that inlet fuel species are entirely consumed before they may encounter the convective heat exchanger tubes 42(*a*).

Air from the turbine exhaust is fed into the gas barrier assembly 71 by feed line 30. Alternatively, air or another gas can be supplied to the gas barrier assembly 71 from another source, e.g. fresh air can be supplied by a blower (not shown). The gas barrier assembly 71 comprises a plurality of gas discharge manifolds 76 (see FIGS. 17 and 18) that run the length of the radiant assembly and radially surround the cluster of parallel and spaced radiant heat exchanger tubes 42(*b*) therein. The plurality of manifolds 76 each have multiple air nozzles 77 (see FIG. 18) which are aimed generally at the radiant heat exchanger tubes 42(*b*) and more particularly at the spaces 78 in between the tubes 42(*b*) to create a cross-flow of air relative to the direction of the tubes 42(*b*). Air discharged by these manifolds 76 create an air pressure barrier 79 around the outer furnace wall surrounding the tubes 42. The barrier 79 allows thermal radiation 80 to pass (gas has low absorption threshold and short radiation transmission path length) but prevents any entrained solids, liquids, and unwanted gases from interacting (fouling or corroding) with the tubes 42(*b*). Because the gas is very hot (>450° C.,) the convective heat loss to the tubes 42(*b*) is reduced. Refractory lining 81 is provided to further minimize convective heat loss on the sides of the tubes 42(*b*) not exposed to thermal radiation from the combustion zone. Refractory diverters 82 are provided that direct the turbine exhaust gases discharged by the gas barrier assembly 71 around the radiant tubes 42(*b*) and the refractory lining 81 to improve the shape the barrier 79 over the length of the radiant heating section 73.

The cross-flow of air discharged by the gas barrier assembly 71 also beneficially helps mix the air-fuel mixture discharged by the burner 49. This is particularly beneficial when unrefined or "dirty" fuel is used, as such fuel typically takes longer to burn out completely. Use of cross-flow air to mix the air-fuel mixture helps reduce burn-out time without having to enlarge the combustion chamber 74.

The radiant heat exchanger tubes (b) contain the working gas from the compressor 22. In a cogeneration application, separate tubes (not shown) containing water for steam production can be installed here.

While the gas barrier assembly 71 is shown with a plurality of gas discharge manifolds 76 surrounding tubes 42(*b*), other configurations can be provided that create a gaseous barrier around the tubes 42(*b*) that impede combustion products from contacting the tubes 42(*b*).

Referring now to FIGS. 4 to 14, alternative embodiments of the power plant 10 are described. The schematics of the power plants 10 shown in these Figures are somewhat simplified compared to the schematic of the power plant 10 shown in FIG. 3 in order to more easily point out the differences between the embodiments. Components shown in the schematic of FIG. 3 but not in FIGS. 4 to 14 does not necessarily indicate that such components are omitted from the embodiments in these Figures.

Figure 4:
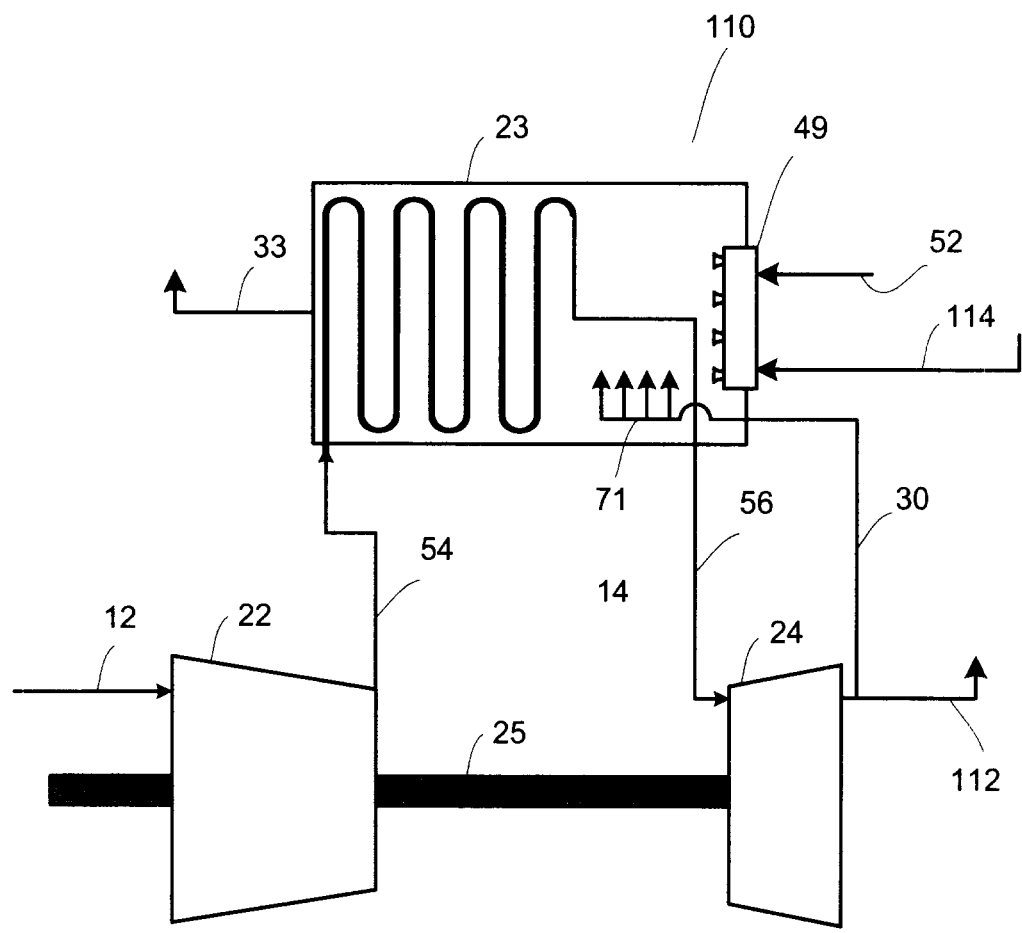
FIG. 4 is a schematic illustration of an indirect-fired gas turbine power plant according to a second embodiment of the invention, and having a combustion air feed line from a fresh air source to a burner of a furnace.

Referring now to FIG. 4 and according to a second embodiment of the invention, a power plant 110 is provided which is essentially identical to the first embodiment except that heated exhaust air from the turbine 24 is exhausted from the power plant via conduit 112, and fresh air or air from a source other than the turbine 24 is fed to the burner 49 via air feed line 114.

Figure 5:
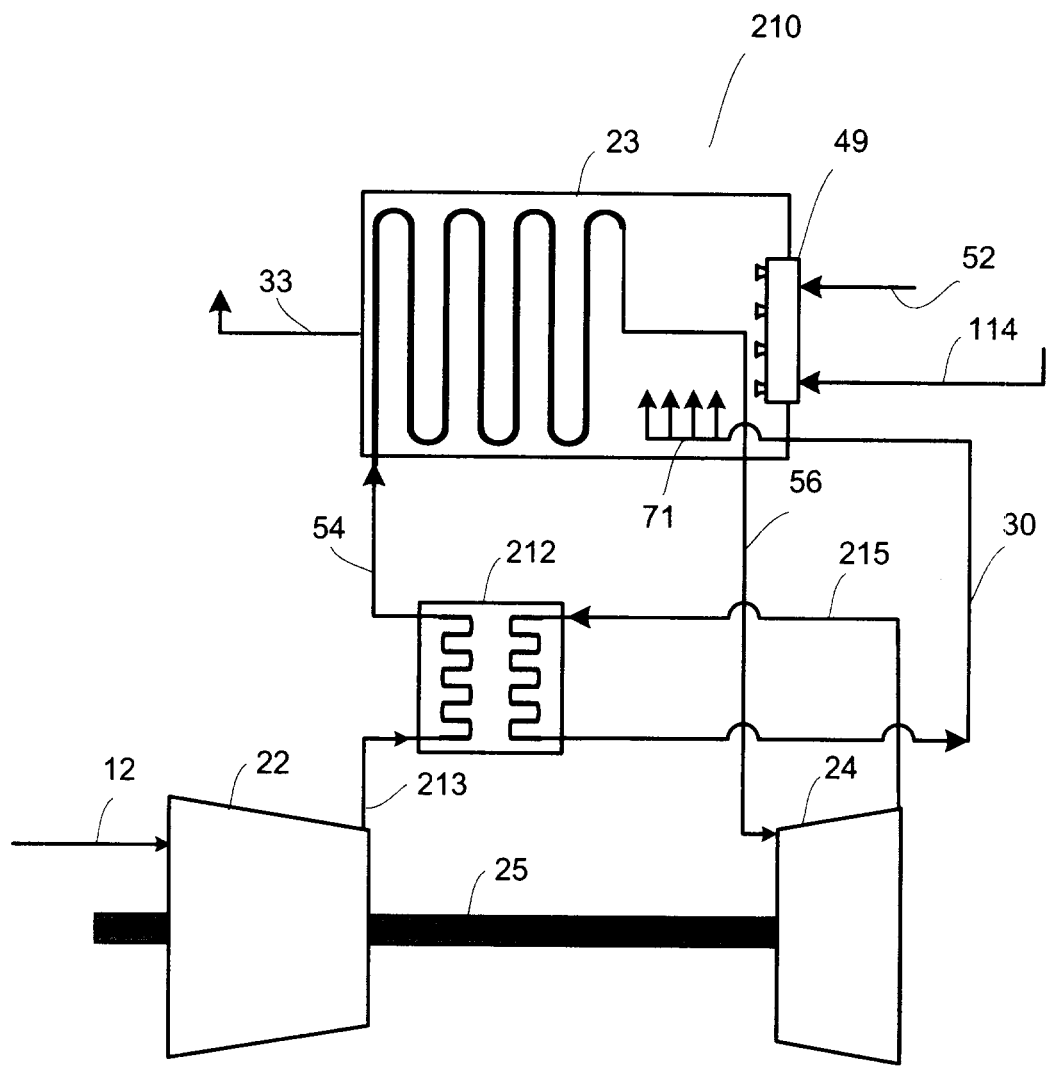
FIG. 5 is a schematic illustration of an indirect-fired gas turbine power plant according to a third embodiment of the invention, and having a recuperator component and a combustion air feed line from a fresh air source to a burner of a furnace.

Referring now to FIG. 5 and according to a third embodiment of the invention, a power plant 210 is provided which is essentially identical to the power plant 110 of the second embodiment, except that it further includes a recuperator 212 thermally coupling a compressed air feed line 213 from the compressor 22 with a heated exhaust air feed line 215 from the turbine 24. Its purpose is to increase the efficiency of the power plant 10, which is accomplished by preheating the air going from the compressor 22 to the heat exchanger 20 using heat in the exhaust gas from the turbine 24, resulting in less heat required from the furnace 23 for any given amount of power output.

Figure 6:
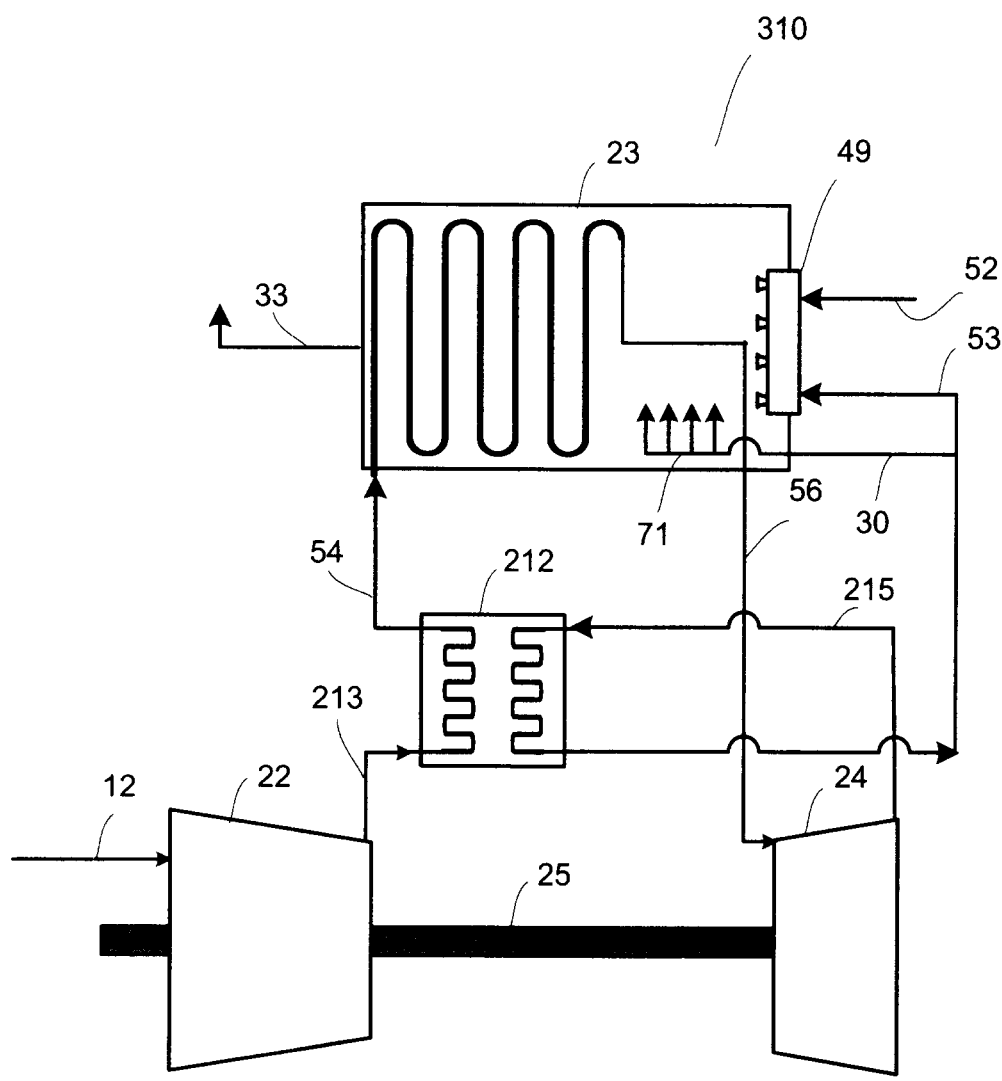
FIG. 6 is a schematic illustration of an indirect-fired gas turbine power plant according to a fourth embodiment of the invention, and having a recuperator component and a combustion air feed line from a turbine to a burner of a furnace.

Referring now to FIG. 6 and according to a fourth embodiment of the invention, a power plant 310 is provided which is essentially the same as the third embodiment except that the exhaust gas from the turbine 24 is fed to the burner 49 by conduit 53 after having passed through the recuperator 212. This configuration provides the additional benefit in that the turbine 24 exhaust can be directly supplied to the furnace 23, further increasing efficiency of the overall system while reducing $NO_x$ emissions.

Figure 7:
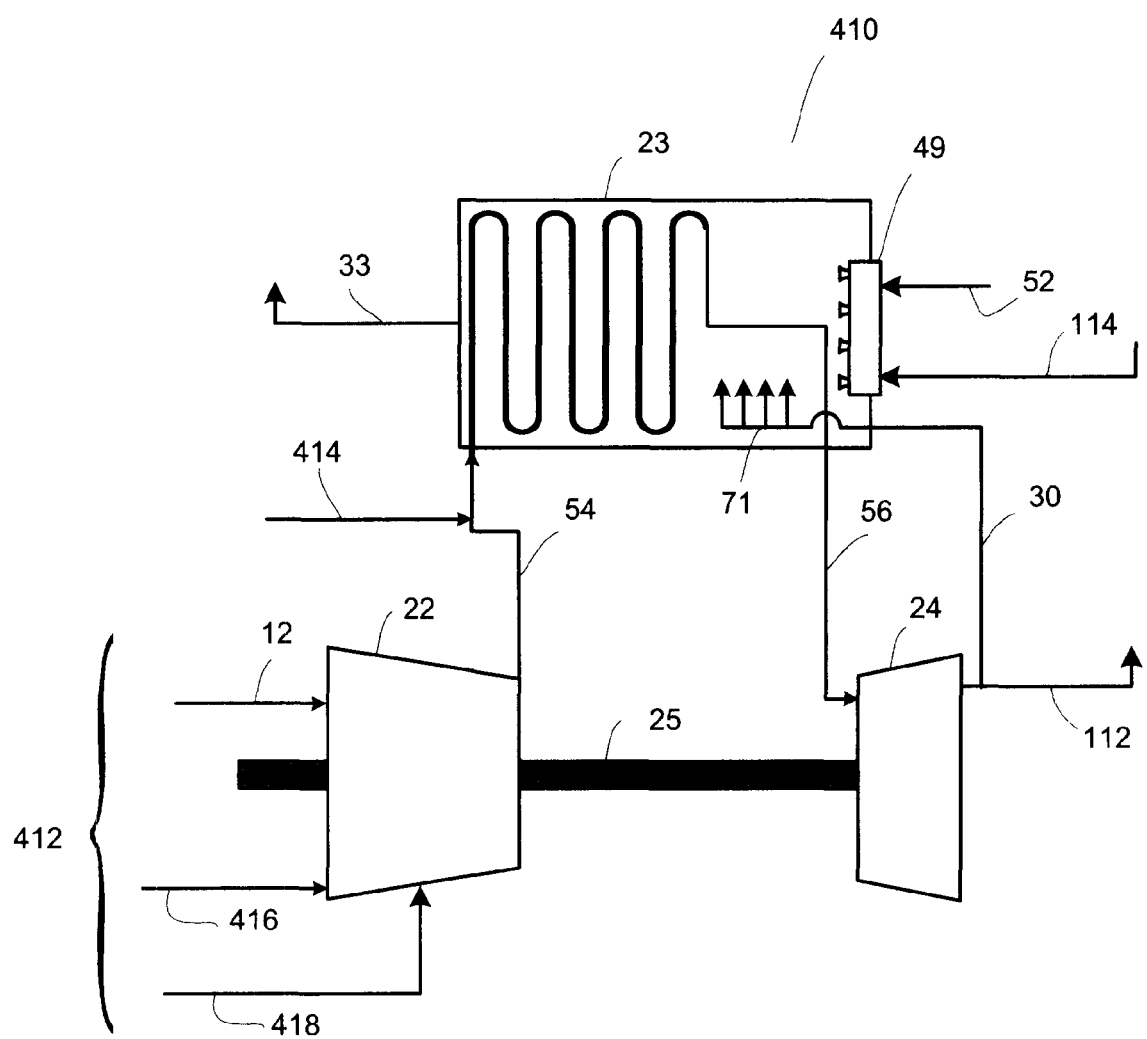
FIG. 7 is a schematic illustration of an indirect-fired gas turbine power plant according to a fifth embodiment of the invention, and having a water spray apparatus, an inlet fogging apparatus, and an intercooling spray apparatus.

Referring now to FIG. 7 and according to a fifth embodiment of the invention, a power plant 410 is provided which is essentially the same as the second embodiment except that it further comprises an evaporative cooling assembly 412. This assembly 412 comprises a water spray 414, a compressor inlet fogging device 416, and a compressor intercooling device 418. Alternatively, the assembly 412 can have one or more of these three features 414, 416, 418. The water spray 414 is coupled to the compressed manifold inlet 54 and supplies a spray of water to a compressed air exhaust stream from the compressor 22, thereby changing the turbine working fluid to a gas/steam mixture. A lower relative work is needed to pump liquid to the spray effectively gets some of the Rankine Cycle advantages in a Brayton Cycle system. The compressor inlet fogging device 416 is coupled to the air inlet 12 and serves to saturate an air supply stream to compressor with water thereby increasing the specific heat of the working fluid. The compressor intercooling device 418 directs a water spray at the compressor 24 thereby increasing the overall cycle work and allowing some increase in the specific heat of the working gas.

Figure 8:
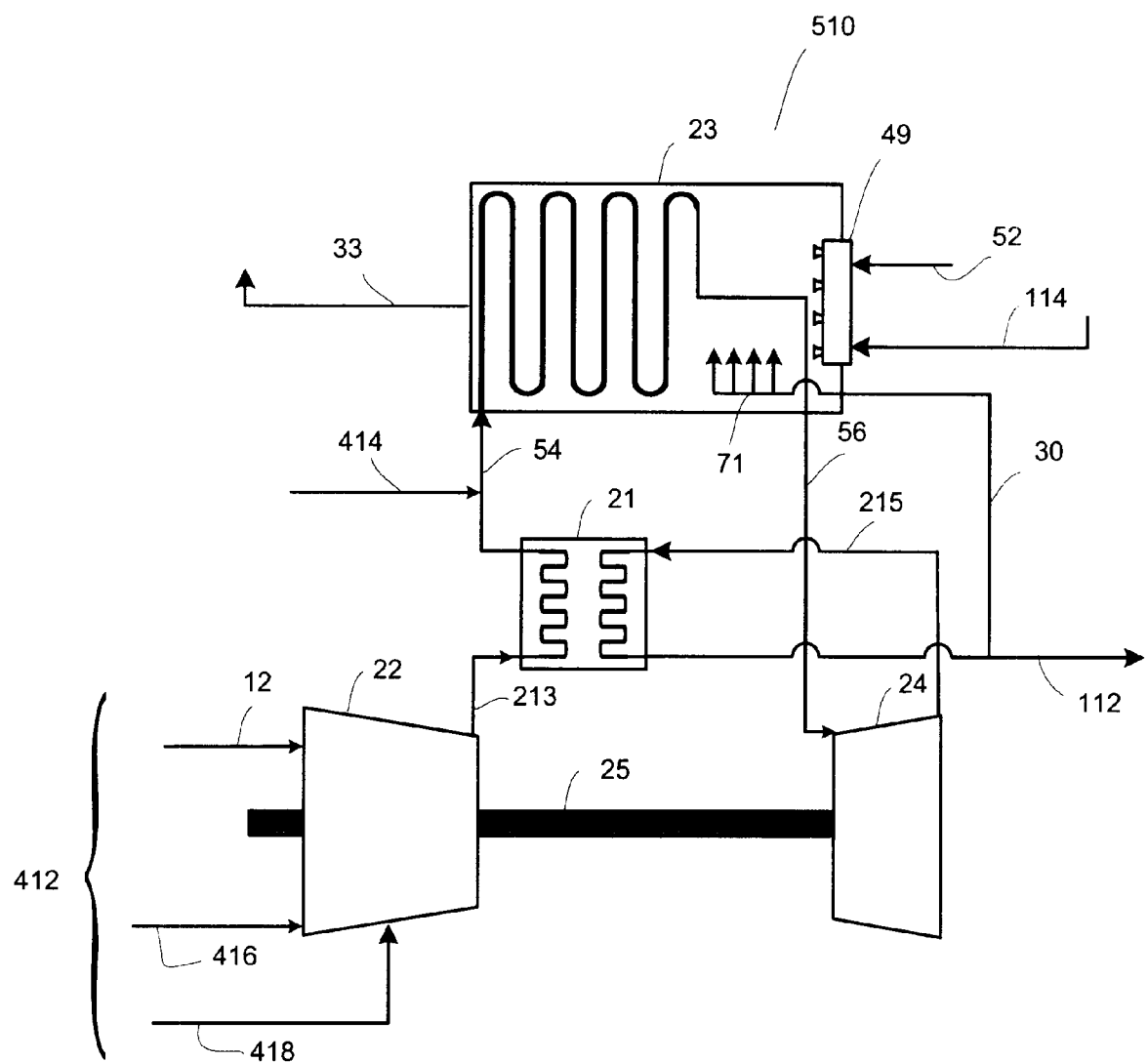
FIG. 8 is a schematic illustration of an indirect-fired gas turbine power plant according to a sixth embodiment of the invention, and having a recuperator component and a water spray apparatus, an inlet fogging apparatus, and a intercooling spray apparatus.

Referring now to FIG. 8 and according to a sixth embodiment of the invention, a power plant 510 is provided which is essentially the same as the fifth embodiment except that it further comprises a recuperator 212 like the one found in the third embodiment.

Figure 9:
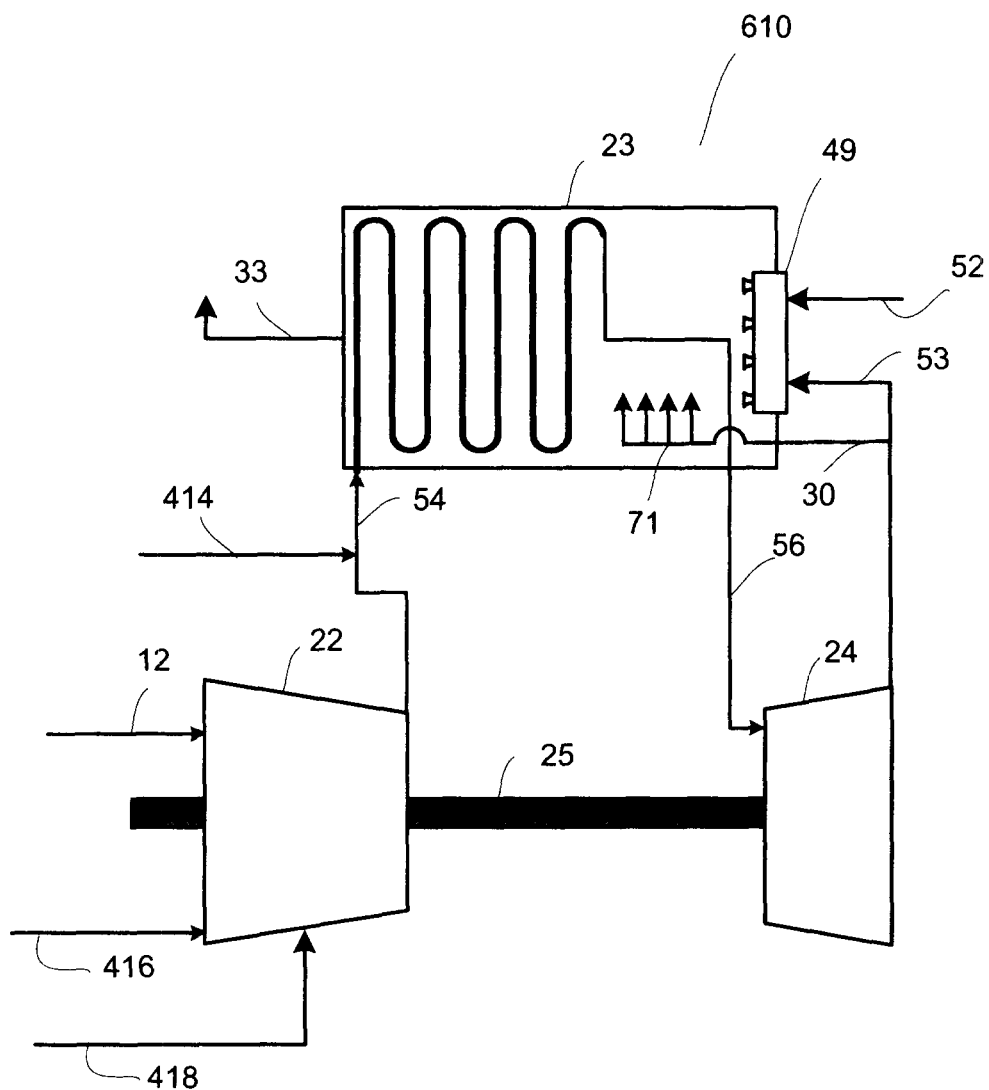
FIG. 9 is a schematic illustration of an indirect-fired gas turbine power plant according to a seventh embodiment of the invention, and having a water spray apparatus, an inlet fogging apparatus, and an intercooling spray apparatus and an air feed line from a turbine to a burner of a furnace

Referring now to FIG. 9 and according to a seventh embodiment of the invention, a power plant 610 is essentially the same as the fifth embodiment except that it further comprises the feedline 53 that directs exhaust air from the turbine 24 to the burner 49.

Figure 10:
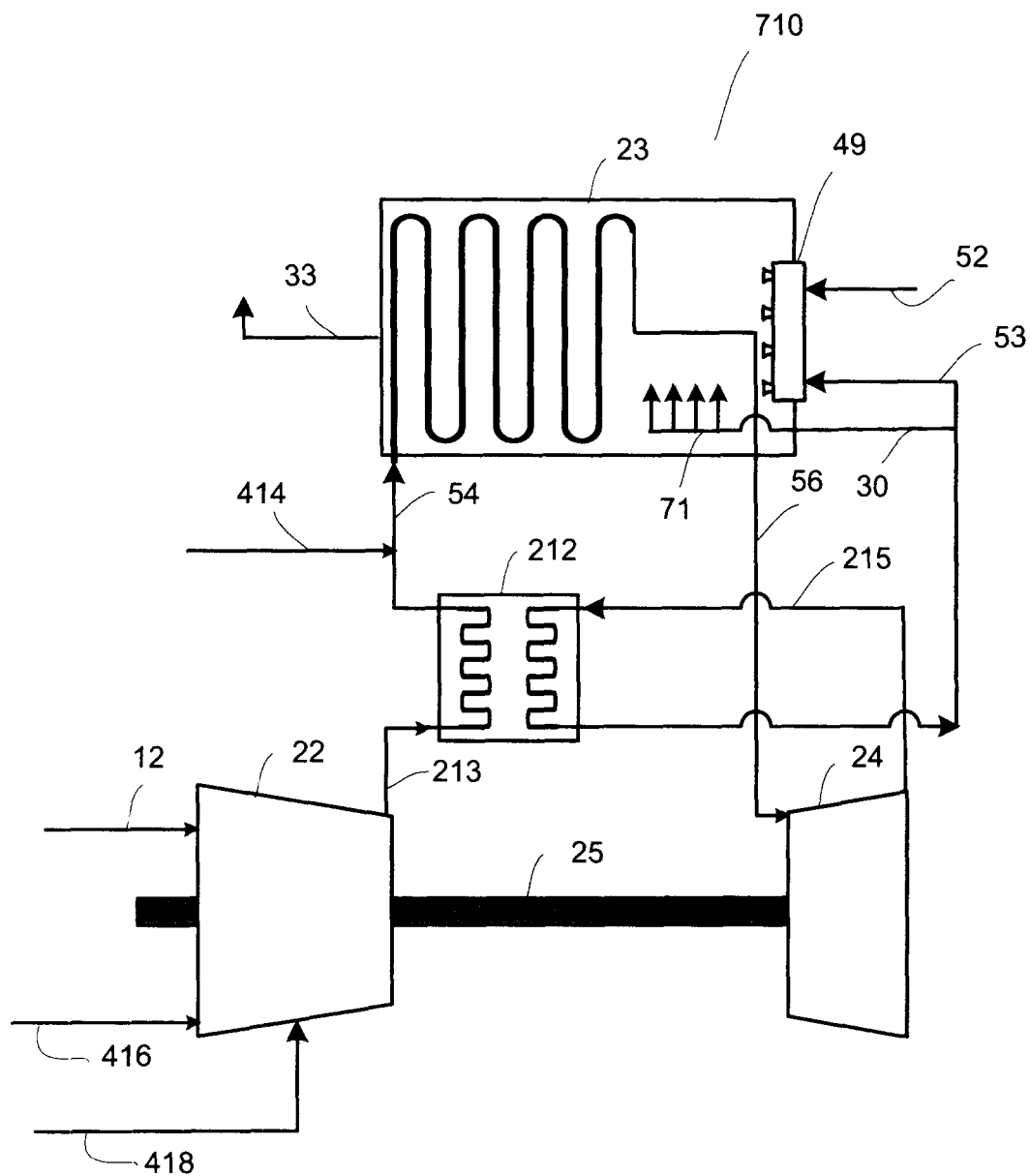
FIG. 10 is a schematic illustration of an indirect-fired gas turbine power plant according to a eighth embodiment of the invention, and having a recuperator component, water spray apparatus, an inlet fogging apparatus, an intercooling spray apparatus and an air feed line from a turbine to a burner of a furnace.

Referring now to FIG. 10 and according to an eighth embodiment of the invention a power plant 710 is provided which is essentially the same as the sixth embodiment except that it further comprise the feedline 53 that directs exhaust air from the turbine 24 to the burner 49 after having passed through the recuperator 212.

Figure 11:
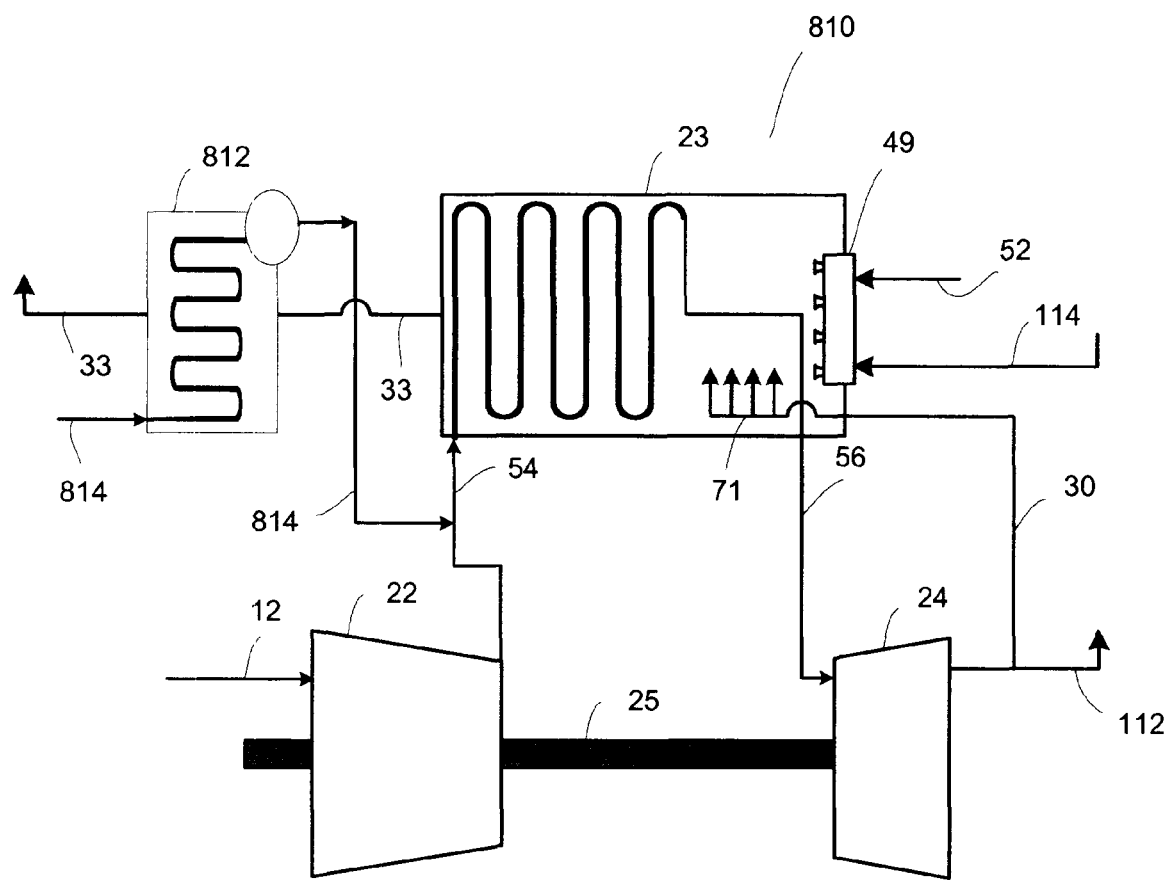
FIG. 11 is a schematic illustration of an indirect-fired gas turbine power plant according to a ninth embodiment of the invention, and having a heat recovery and steam generator.

Referring now to FIG. 11 and according to a ninth embodiment of the invention, a power plant 810 is provided which is essentially the same as the second embodiment except that it further comprises a steam injection assembly 812 thermally coupling the exhaust conduit 33 from the furnace 23 with water conduits 814. The steam injection assembly 812 operates similarly to the heat exchanger assembly 20 to transfer heat from the furnace exhaust to the water in the water conduit 814, thereby creating steam therein. The water conduit 814 is coupled to the working gas manifold inlet 54 and serves to supply steam to the working gas for the turbine 24. The steam cycle specific back-work is lower because water pumping is less work intensive than air compression, in effect getting some of the Rankine Cycle advantages in a Brayton Cycle system.

Figure 12:
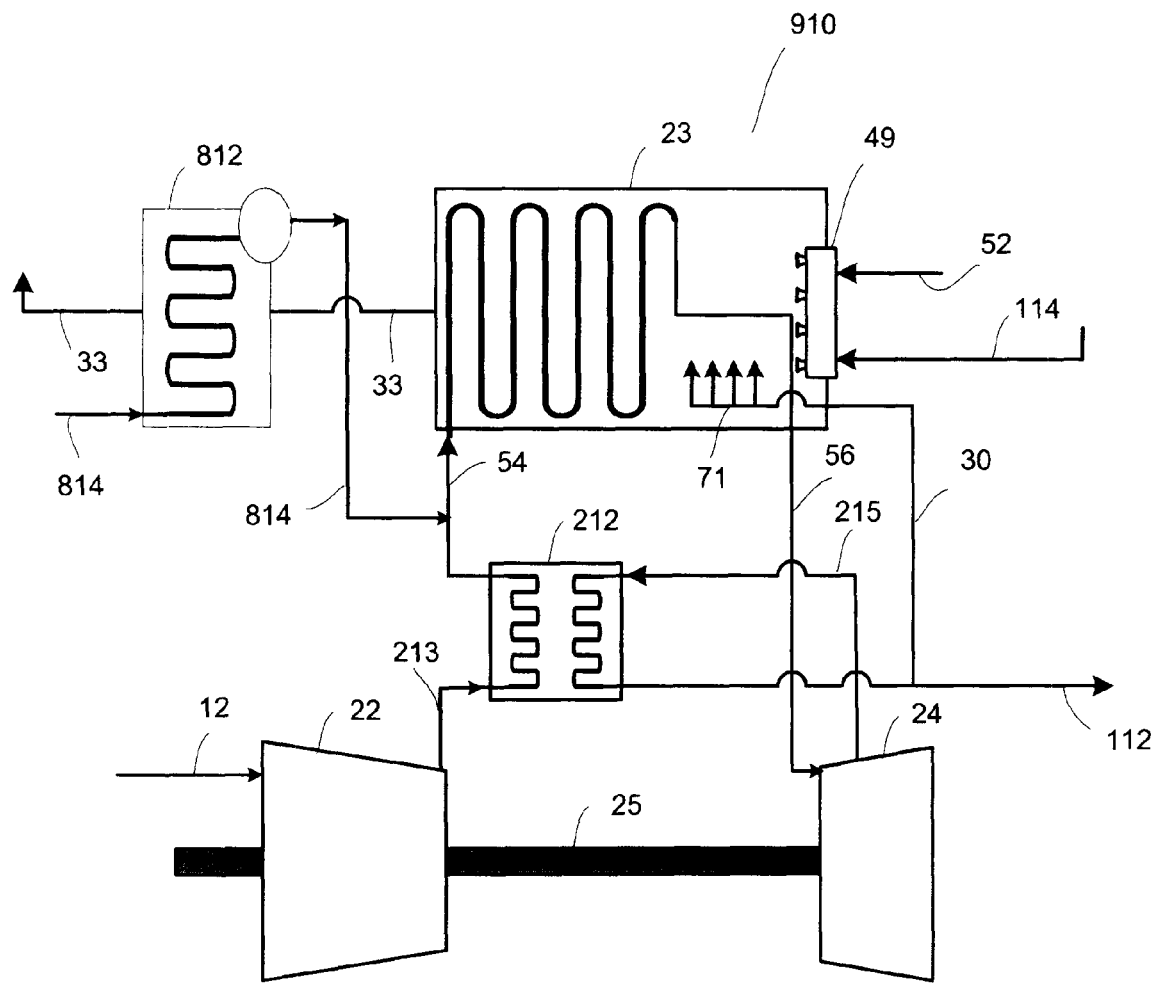
FIG. 12 is a schematic illustration of an indirect-fired gas turbine power plant according to a tenth embodiment of the invention, and having a recuperator component and a heat recovery and steam generator.

Referring now to FIG. 12 and according to a tenth embodiment of the invention, a power plant 910 is provided which is essentially the same as the ninth embodiment except that it further comprises a recuperator like the one used in the third embodiment.

Figure 13:
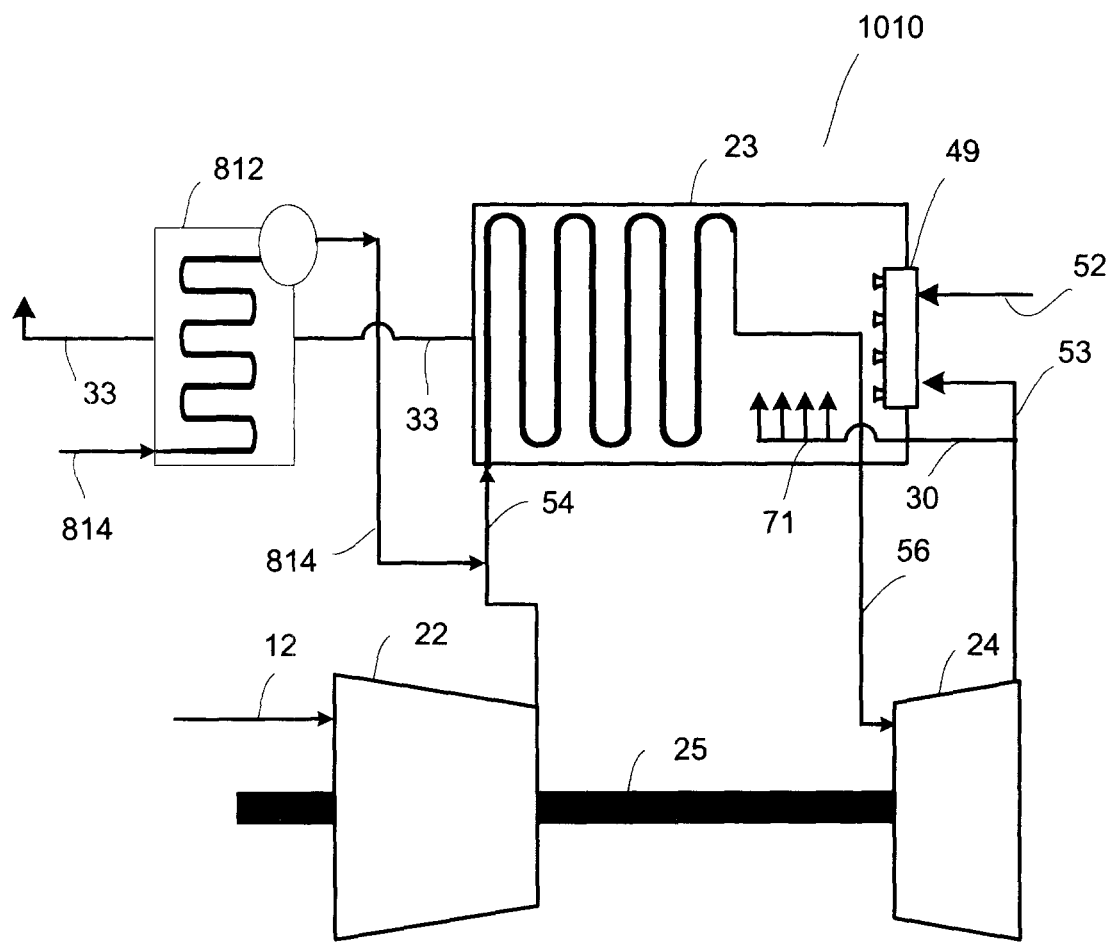
FIG. 13 is a schematic illustration of an indirect-fired gas turbine power plant according to a eleventh embodiment of the invention, and having a heat recovery and steam generator and an air feed line from a turbine to a burner of a furnace.

Referring now to FIG. 13 and according to an eleventh embodiment of the invention, a power plant 1010 is provided which is essentially the same as the ninth embodiment except that it further comprise the feedline 53 that directs exhaust air from the turbine 24 to the burner 49 after having passed through the recuperator 212.

Figure 14:
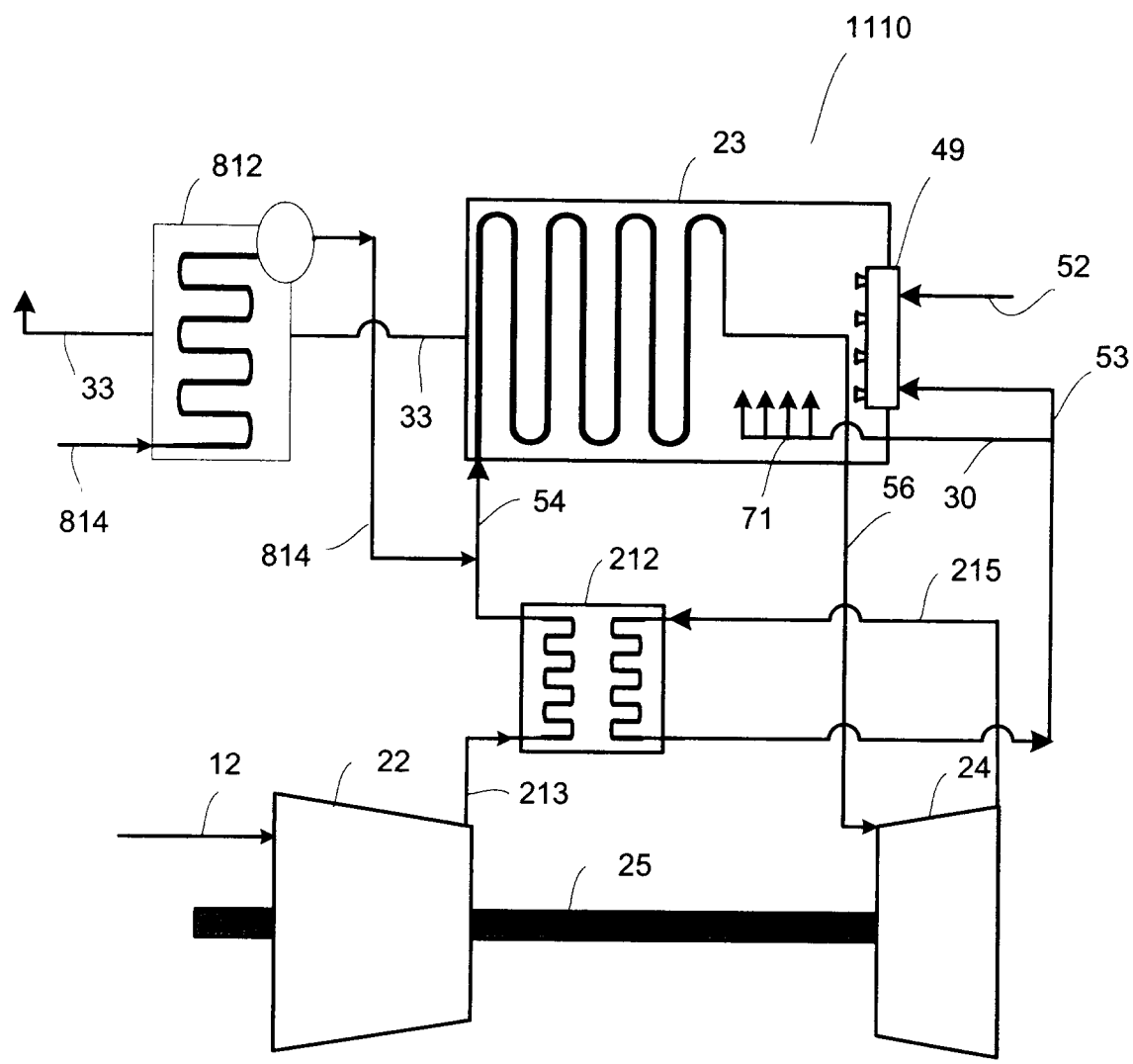
FIG. 14 is a schematic illustration of an indirect-fired gas turbine power plant according to a twelfth embodiment of the invention, and having a recuperator component, a heat recovery and steam generator and an air feed line from a turbine to a burner of a furnace.
Figure 15:
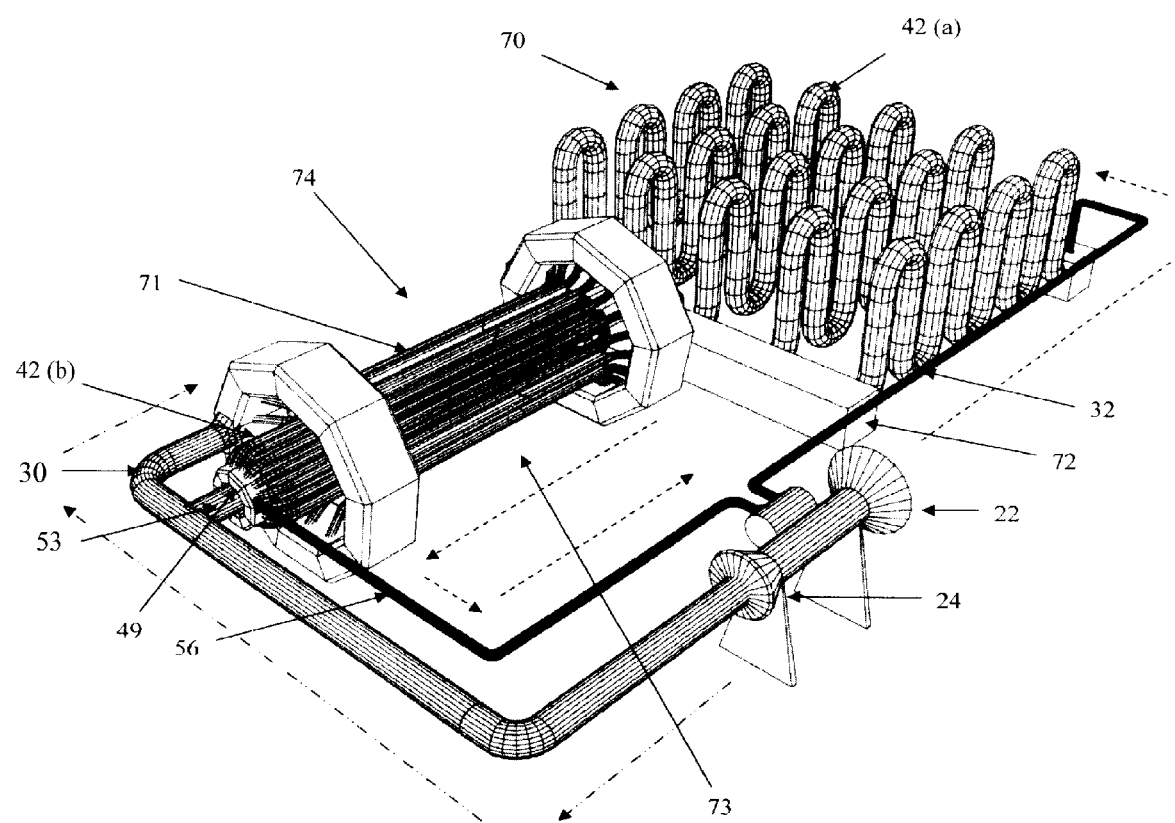
FIGS. 15 and 16 are perspective and top plan views of certain components of the power plant in all of the embodiments of the invention.
Figure 16:
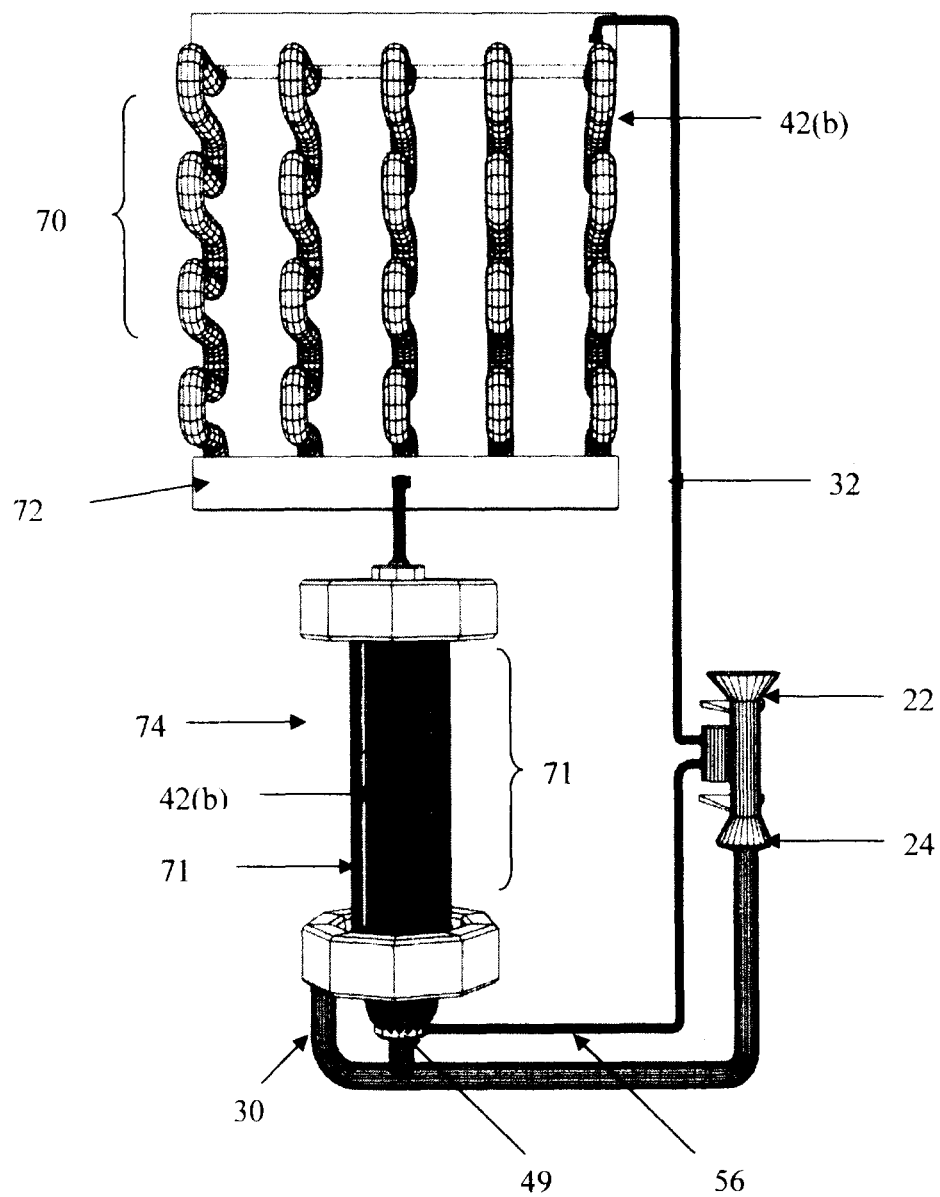
Figure 17:
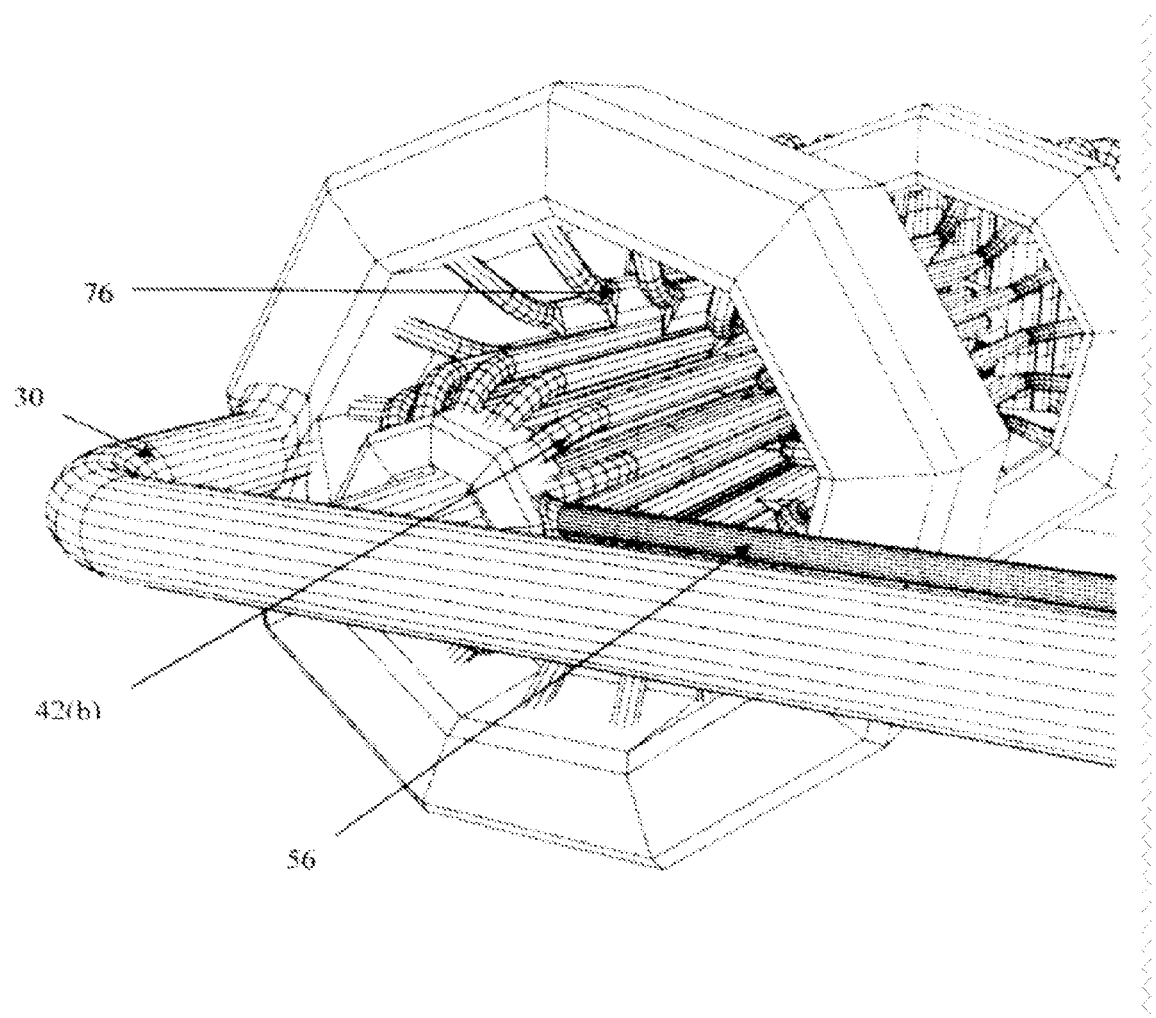
FIG. 17 is a detailed perspective view of certain components in the furnace of the power plant in all of the embodiments of the invention.
Figure 18:
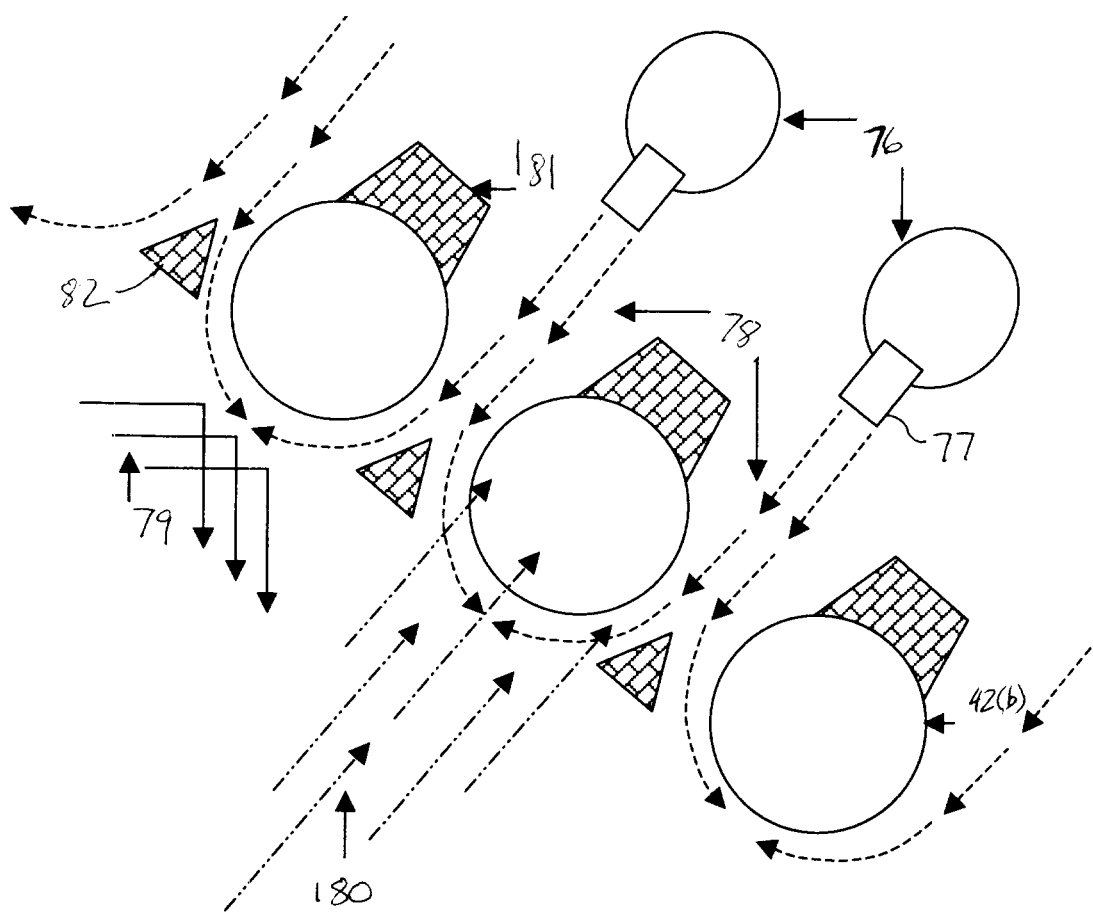
FIG. 18 is a schematic illustration of an gas barrier assembly and heat exchanger conduits of the power plant in all of the embodiments of the invention.

Referring now to FIG. 14 and according to an twelfth embodiment of the invention, a power plant 1110 is provided which is essentially the same as the tenth embodiment except that it further comprise the feedline 53 that directs exhaust air from the turbine 24 to the burner 49 after having passed through the recuperator 212.

The embodiments of the power plant 10 described herein can be modular, with each component created for a specific function and having to interact with other components only at certain points, drastically improving the life of the individual components. Another feature of note is the incorporation of a remote telemetric monitoring system (not shown); this will allow for performance tracking, alerts for potential problems, unit tracking and output monitoring. Each unit should also include emission control systems (not shown) that will vary according to the requirements of individual users. The addition of these emission control measures and remote telemetrics enhances the entire process, making it more functional for the end user.

The preferred power plant according to the present invention can be housed on two standard skid mounts (not shown) that are then coupled together during operations. One skid assembly would contain the gas turbine engine, turnkey generator 46, onboard substation and one-half of the high-temperature heat exchanger 20. The other skid would house the furnace 23, stack with emission control and the other half of the heat exchanger 20.

The furnace 23 with the gas barrier assembly 71 can be used in applications other than gas turbines. For example, operation of the gas barrier assembly 71 can extend to furnace applications that have no access to a gas turbine but operate in a manner where the radiant section is subject to extreme environments where dirty fuels are being used. Some examples of this include biomass or municipal solid waste heat recovery furnaces, blast furnaces and any facility that utilizes coal. In such non-gas turbine applications, the heat load and mass flow that would be typically provided by a gas turbine's exhaust can be emulated by other means as known in the art.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. The invention is therefore to be considered limited solely by the scope of the appended claims.

We claim:

1. An indirect-fired gas turbine power plant comprising:
 (a) a compressor;
 (b) a turbine mechanically coupled to the compressor;
 (c) a furnace;

(d) a heat exchanger inside the furnace and fluidly coupled at an inlet end of the heat exchanger to the compressor and at an outlet end of the heat exchanger to the turbine; and (e) means for forming a gas barrier around a portion of the heat exchanger to impede combustion products from contacting the heat exchanger, wherein the gas barrier comprises a gas.

2. A power plant as claimed in claim 1 wherein the means for forming a gas barrier is fluidly coupled to the turbine to receive heated working gas exhausted from the turbine for forming the gas barrier.

3. A power plant as claimed in claim 1 wherein the heat exchanger comprises a convective heating section and a radiant heating section, and wherein the means for forming a gas barrier is around the radiant heating section.

4. A power plant as claimed in claim 1 wherein the furnace further comprises a burner fluidly coupled to a fuel source selected from the group consisting of coal, heavy oil, biomass, solution gas, and combustible waste material.

5. A power plant as claimed in claim 4 wherein the furnace further comprises an afterburner at an exhaust end of the furnace and fluidly coupled to the fuel source.

6. A power plant as claimed in claim 4 wherein the burner is fluidly coupled to the turbine to receive heated air exhausted from the turbine for combustion in the furnace.

7. A power plant as claimed in claim 3 wherein the means for forming a gas barrier comprises at least one manifold coupled to a gas source and having at least one gas nozzle directed at around a portion of the radiant heating section.

8. A power plant as claimed in claim 7 wherein the means for forming a gas barrier comprises a plurality of manifolds surrounding the portion of the radiant heating section.

9. A power plant as claimed in claim 8 wherein the portion of the radiant heating section surrounded by the means for forming a gas barrier comprises a plurality of generally straight and parallel spaced conduits, and the manifolds are directed at spaces in between the conduits.

10. A power plant as claimed in claim 9 wherein the furnace further comprises a refractory lining covering a part of at least some of the conduits.

11. A power plant as claimed in claim 9 wherein the means for forming a gas barrier further comprises a refractory diverter positioned around the manifolds and conduits such that gas discharged by the means for forming a gas barrier is directed to form the gas barrier.

12. A power plant as claimed in claim 1 further comprising a recuperator thermally coupling a working gas exhausted from the turbine with a working gas stream from the compressor to the heat exchanger.

13. A power plant as claimed in claim 12 wherein the burner is fluidly coupled to the turbine to receive heated air exhausted from the turbine for combustion in the furnace.

14. A power plant as claimed in claim 1 further comprising an evaporative cooling assembly coupled to the compressor.

15. A power plant as claimed in claim 14 wherein the evaporative cooling assembly further comprises at least one of an inlet fogging device fluidly coupled to a working gas supply stream to the compressor, a water spray fluidly coupled to a working gas stream from the compressor to the heat exchanger, and an intercooling spray directed at the compressor.

16. A power plant as claimed in claim 15 further comprising a recuperator thermally coupling a working gas exhausted from the turbine with the working gas stream from the compressor to the heat exchanger.

17. A power plant as claimed in claims 15 wherein the burner is fluidly coupled to the turbine to receive heated air exhausted from the turbine for combustion in the furnace.

18. A power plant as claimed in claim 1 further comprising a steam injection assembly thermally coupling an exhaust stream from the furnace with a water stream fluidly coupled to a working gas stream from the compressor to the heat exchanger.

19. A power plant as claimed in claim 18 further comprising a recuperator thermally coupling a working gas exhausted from the turbine with the working gas stream from the compressor to the heat exchanger.

20. A power plant as claimed in claims 18 wherein the burner is fluidly coupled to the turbine to receive heated air exhausted from the turbine for combustion in the furnace.

21. An indirect-fired gas turbine power plant comprising: a compressor;
    (a) a turbine mechanically coupled to the compressor;
    (b) a furnace;
    (c) a heat exchanger inside the furnace and fluidly coupled at an inlet end of the heat exchanger to the compressor and at an outlet end of the heat exchanger to the turbine; and
    (d) a gas discharge manifold around a portion of the heat exchanger and operable to form a gaseous barrier that impedes combustion products from contacting the portion of the heat exchanger, wherein the gaseous barrier comprises a gas.

22. A furnace for an indirect-fired gas turbine power plant comprising a compressor and a turbine mechanically coupled to the compressor, the furnace comprising
    (a) a heat exchanger inside the furnace and for fluidly coupling at an inlet end of the heat exchanger to the compressor and at an outlet end of the heat exchanger to the turbine; and
    (b) means for forming a gas barrier around a portion of the heat exchanger to impede combustion products from contacting the heat exchanger, wherein the gaseous barrier comprises a gas.

23. A furnace for an indirect-fired gas turbine power plant comprising a compressor and a turbine mechanically coupled to the compressor, the furnace comprising
    (a) a heat exchanger inside the furnace and for fluidly coupling at an inlet end of the heat exchanger to the compressor and at an outlet end of the heat exchanger to the turbine; and
    (b) a gas discharge manifold around a portion of the heat exchanger and operable to form a gaseous barrier that impedes combustion products from contacting the portion of the heat exchanger, wherein the gaseous barrier comprises a gas.

* * * * *